(12) United States Patent
Arai

(10) Patent No.: US 8,614,824 B2
(45) Date of Patent: Dec. 24, 2013

(54) PRINTING CONTROL APPARATUS, PRINTING CONTROL METHOD, AND STORAGE MEDIUM

(75) Inventor: Katsutoshi Arai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 13/051,583

(22) Filed: Mar. 18, 2011

(65) Prior Publication Data

US 2011/0235064 A1 Sep. 29, 2011

(30) Foreign Application Priority Data

Mar. 24, 2010 (JP) ................................. 2010-068280

(51) Int. Cl.
*G06K 15/02* (2006.01)
*G06F 3/12* (2006.01)
*H04N 1/387* (2006.01)
*B41J 11/44* (2006.01)

(52) U.S. Cl.
USPC .............. 358/1.2; 358/1.15; 358/452; 400/76

(58) Field of Classification Search
USPC .............................. 358/1.2, 1.15, 452; 400/76
See application file for complete search history.

(56) References Cited

U.S. PATENT DOCUMENTS

2002/0164185 A1* 11/2002 Horiuchi et al. ................ 400/76
2007/0177201 A1*  8/2007 Tanaka et al. ................ 358/1.15

FOREIGN PATENT DOCUMENTS

JP        10-006600 A     1/1998

* cited by examiner

*Primary Examiner* — Miya J Cato
*Assistant Examiner* — Temitayo Folayan
(74) *Attorney, Agent, or Firm* — Canon U.S.A., Inc. IP Division

(57) ABSTRACT

A printing control apparatus determines a size of a recording medium based on an instruction to print an image of a predetermined size in the recording medium. A control unit causes application software to generate data to be printed having a size corresponding to the number of pages and the size of one page according to the instruction, causes a printer driver to generate print data based on the generated data to be printed corresponding to the size of the recording medium and the number of pages by registering the determined size of the recording medium in the printer driver and by designating processing for generating the print data of a size corresponding the size of the recording medium according to the instruction, and causes the printer driver to execute processing for printing the image of the number of pages on the recording medium of the size.

11 Claims, 20 Drawing Sheets

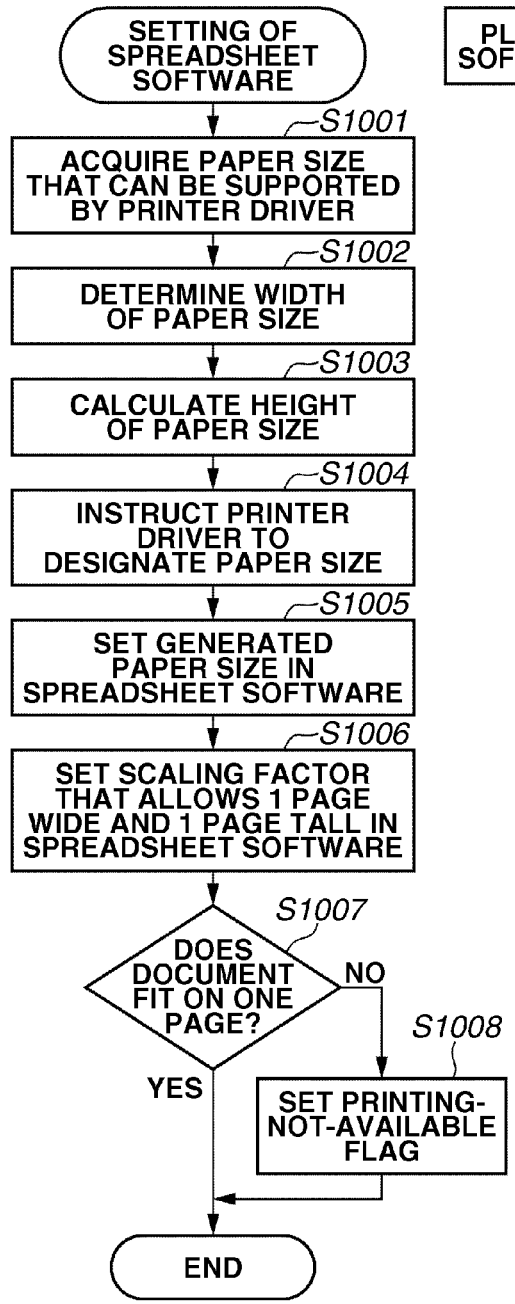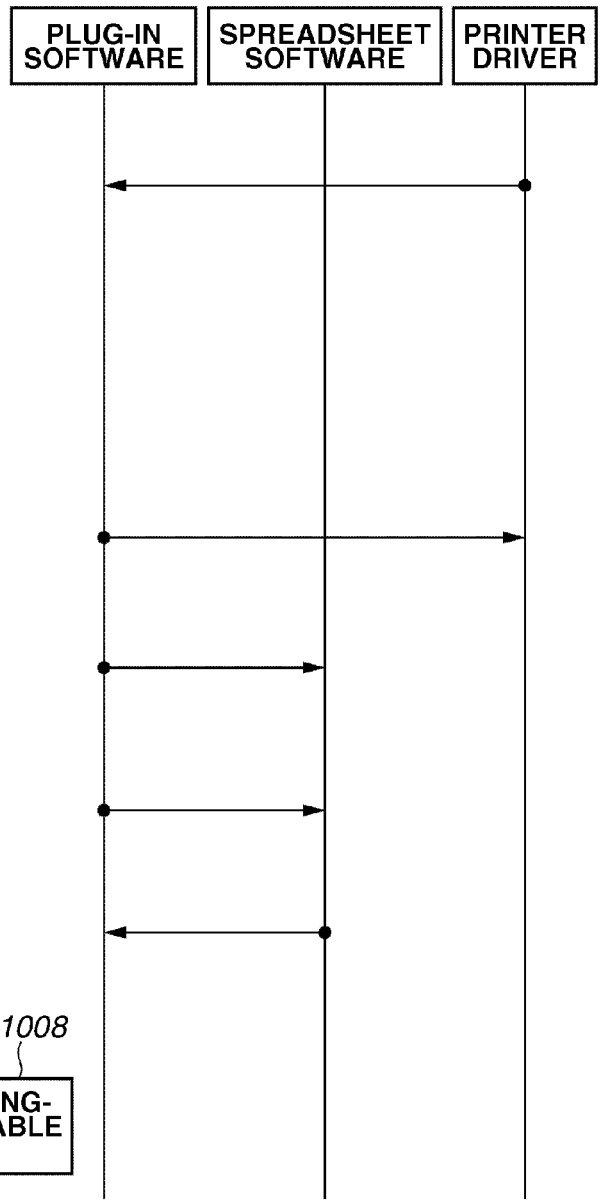

FIG.15A
FIG.15B
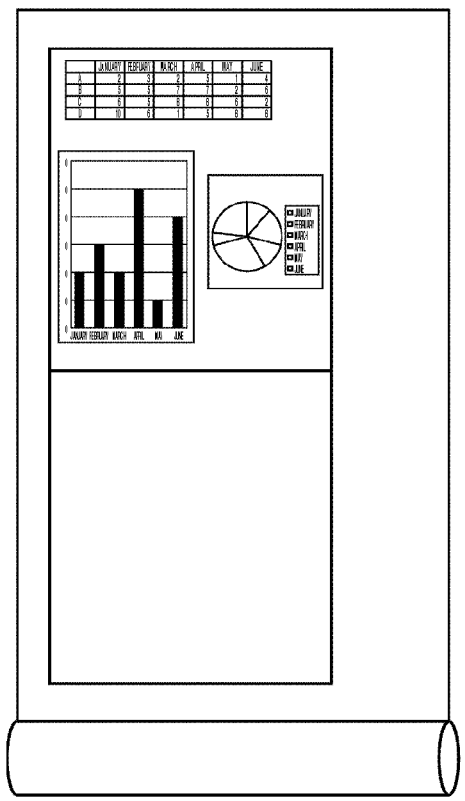
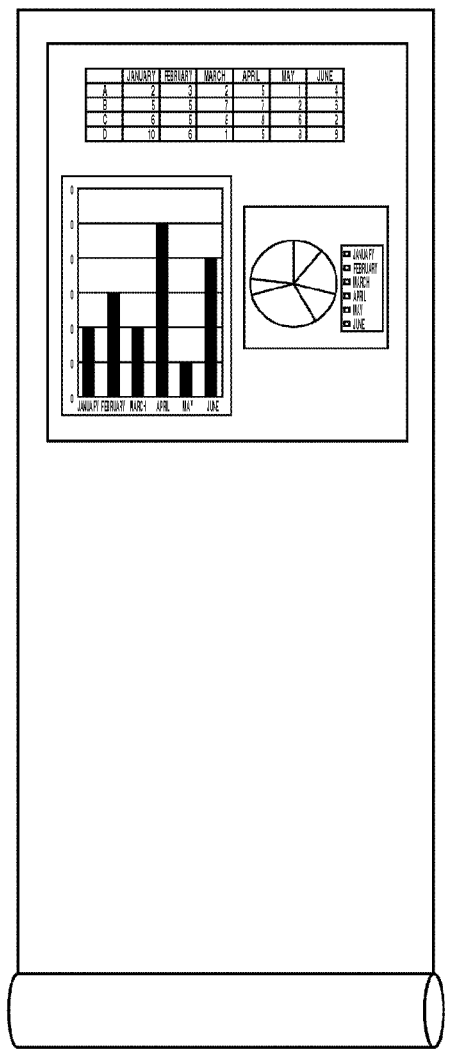

PRINTING CONTROL APPARATUS, PRINTING CONTROL METHOD, AND STORAGE MEDIUM

BACKGROUND OF THE INVENTION

1. Field of the Invention

The present invention relates to a printing control apparatus causing a printing apparatus to print an image, a printing control method, and a storage medium.

2. Description of the Related Art

To print a table or a graph generated by spreadsheet software, it is necessary to set a page for the table or the graph. The spreadsheet software divides the table or the graph to be printed into areas according to paper size. Each of the areas obtained by the division is regarded as data corresponding to one page.

However, the area set as a page not always results in what a user desires. When the area is not desirable, the user needs to change the paper size used for the page setting or to change the range of the cells included in one page. Such page adjustment is performed by the user by operating an input device, such as a mouse or the like.

A technique that attempts to eliminate the need for user interaction and automatically allows page settings to match the print area has been proposed. For example, Japanese Patent Application Laid-Open No. 10-006600 discusses a technique that allows calculation of a size of a print area. According to this technique, if a user sets a print area, the size of the print area is calculated based on information on the cells included in the print area, the width of the columns, or the size of the character fonts. Then, a paper size into which the calculated print area fits is automatically selected from the standard paper sizes managed by the system.

However, even if the standard paper size can be automatically selected as described above, the selected paper size in width or in height may not always meet the size of the print area generated by the spreadsheet software, and may result in unwanted margins when the data is printed.

SUMMARY OF THE INVENTION

According to an aspect of the present invention, a printing control apparatus which causes a printing apparatus to print an image based on data generated by application software includes a determination unit configured to determine, according to an instruction given by a user for causing the printing apparatus to print an image of a size corresponding to a size of a recording medium onto the recording medium, the size of the recording medium, a first control unit configured to cause the application software to generate, by setting a number of pages of the pages assigned to data to be printed and a size of one page of the pages in the application software, data to be printed having a size corresponding to the number of pages and the size of the one page, according to the instruction, a second control unit configured to cause the printer driver to generate, by registering the size of the recording medium determined by the determination unit in a printer driver and designating processing for generating the print data of a size corresponding to the size of the recording medium, and by causing the printer driver to acquire the data to be printed generated by the application software according to the first control unit, print data based on the data to be printed corresponding to the size of the recording medium and the number of pages, according to the instruction, and a printing control unit configured to cause the printer driver to execute, based on the print data generated by the printer driver according to the second control unit, processing for causing the printing apparatus to print the image of the number of pages on the recording medium having the size.

According to an exemplary embodiment of the present invention, the user can print an image on a recording medium corresponding to a size of the recording medium by a simple operation.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 10A and 10B illustrate processing procedures performed by a spreadsheet software setting unit in step S802 in FIG. 8.

FIGS. 15A to 15C illustrate a relation between a recording medium on which printing is to be performed and print data.

DESCRIPTION OF THE EMBODIMENTS

Various exemplary embodiments, features, and aspects of the invention will be described in detail below with reference to the drawings.

Now, referring to the attached drawings, plug-in software of spreadsheet software will be taken as an exemplary embodiment of the present invention, and the operation of the plug-in software will be described in a detailed and concrete manner. The plug-in software is a program used for adding a function to an application. Further, according to the present exemplary embodiment, the spreadsheet software will be described as an example of the application.

Figure 1:
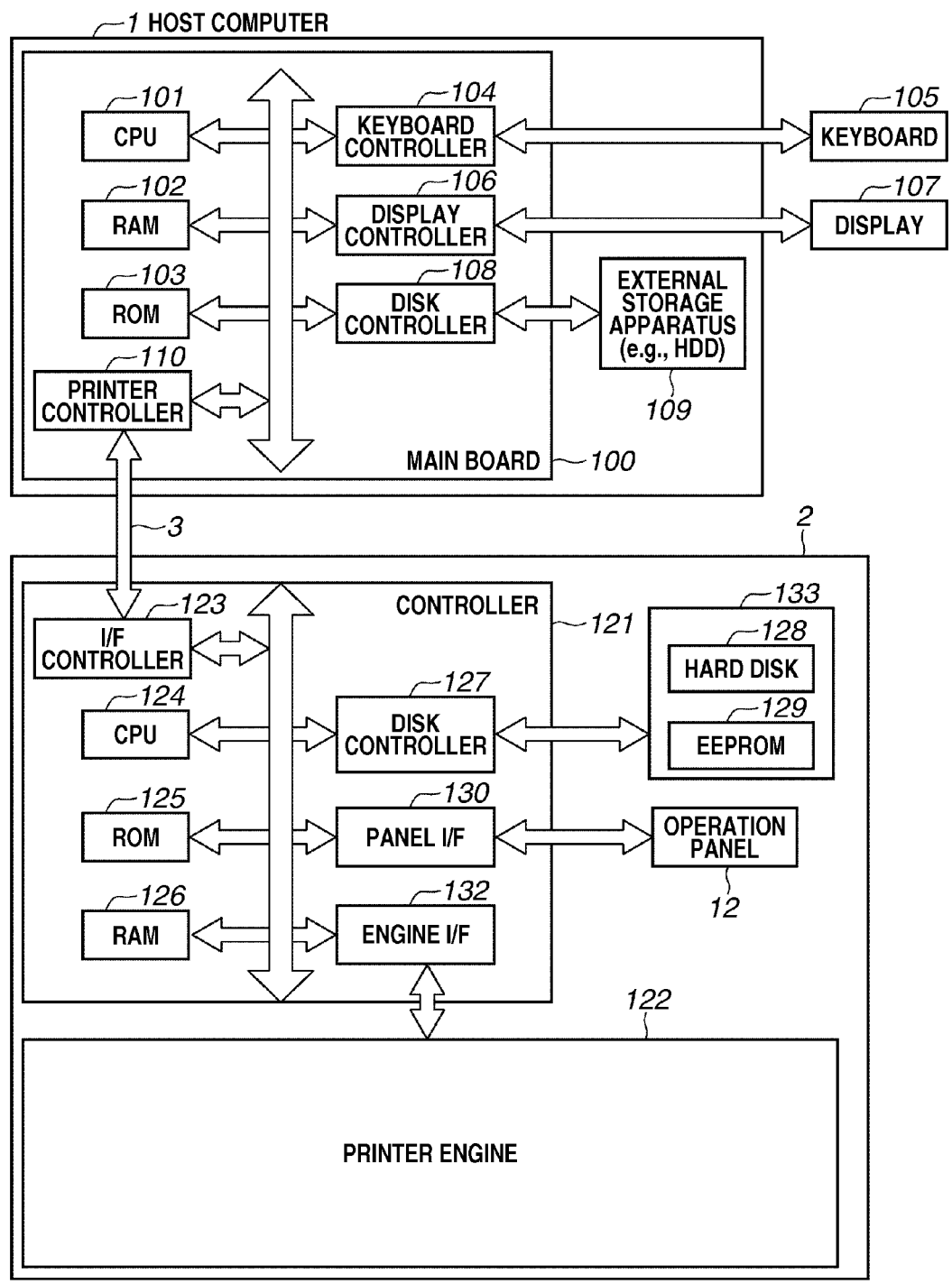
FIG. 1 is a block diagram illustrating a configuration of a printing system according to an exemplary embodiment of the present invention.

FIG. 1 is block diagram illustrating a configuration of a printing system according to an exemplary embodiment of the present invention. The printing system includes a host computer 1 and an ink jet printer (hereinafter referred to as a printer) 2 as a printing control apparatus. Although the present invention employs an ink jet printer that prints information on roll paper, which is an example of a continuous sheet, as the printer in the description, a printer using an electrophotographic recording method or an offset printing machine can also be used.

Further, the recording medium on which printing is to be performed is not limited to roll paper. In addition to roll paper, the present invention can be applied to a recording medium which is cut according to a print area. Further, the present invention can be applied to paper having a predetermined size, which is so-called cut paper.

As illustrated in FIG. 1, a host computer 1 and a printer 2 are connected via a bidirectional connection interface 3 (e.g., a universal serial bus (USB) connection, an Institute of Electrical and Electronics Engineers (IEEE) 1394 connection, or a Transmission Control Protocol/Internet Protocol (TCP/IP) connection). The host computer 1 is an image processing apparatus such as a personal computer (PC). The host computer 1 can control the printer 2 via the bidirectional connection interface 3 and causes the printer 2 to perform printing.

The host computer 1 is connected to an operation unit such as a keyboard 105 and a display 107 which is a liquid crystal display (LCD) or the like. The host computer 1 includes an external storage unit 109 which is, for example, an internal hard disk drive (HDD) or an external storage apparatus. Further, the host computer 1 includes, in a main board 100, a central processing unit (CPU) 101, a random access memory (RAM) 102, a read-only memory (ROM) 103, a keyboard controller 104, a display controller 106, a disk controller 108, and a printer controller 110.

These units and controllers are connected to a system bus and the CPU 101 controls each of these components. The RAM 102 functions as a main memory or a work area of the CPU 101. The ROM 103 stores an operating system, a program used for realizing each function of the exemplary embodiment, a boot program, various kinds of applications, a user file, and a printer control command generation program (hereinafter called a printer driver). The CPU 101 controls each component of the host computer 1 by executing various programs stored in the ROM 103 by using the RAM 102 as a work memory.

The keyboard controller 104 controls operation units such as the keyboard 105 and a pointing device (not shown). Instructions given by the user are input via these operation units. The display controller 106 controls the display 107. Image data stored in the RAM 102 is displayed on the display 107 by the control of the display controller 106.

The disk controller 108 controls access to the external storage unit 109 being a hard disk or the like and performs reading and writing of data with respect to the external storage unit 109. The printer controller 110 is connected to the printer 2 via the bidirectional interface 3. The printer controller 110 controls the communication processing of data and command between the host computer 1 and the printer 2. According to the control by the printer controller 110, image data stored in the RAM 102 is output to the printer 2 and printed.

Next, the configuration of the printer 2 will be described. As illustrated in FIG. 1, the printer 2 includes a controller 121, a printer engine 122, an operation panel 12, and a non-volatile storage unit 133. The printer 2 is connected to the host computer 1 via the bidirectional interface 3. The non-volatile storage unit 133 includes a non-volatile memory such as a hard disk 128 or an electrically erasable programmable read-only memory (EEPROM) 129.

The controller 121 includes a CPU 124, a ROM 125, a RAM 126, an interface (I/F) controller 123, a disk controller 127, a panel interface 130, and an engine interface 132. As illustrated in FIG. 1, these components are connected to a system bus, and the CPU 124 controls each component in an overall manner by executing various programs. Various programs used for controlling the printer engine 122 are stored in the ROM 125. The RAM 126 is used as a work area that temporarily stores various types of data and various programs executed by the CPU 124. By executing a program stored in the ROM 125 by using the RAM 126 as a work memory, the CPU 124 controls each component of the printer 2.

The interface controller 123 is connected to the host computer 1 via the bidirectional interface 3, and controls the communication processing of data and command between the printer 2 and the host computer 1. For example, the interface controller 123 receives image data to be printed or a command (a command for executing printing, a command for inquiring the status of the printer, or a command for changing various settings of the printer, etc.) from the host computer 1. When data or a command received by the interface controller 123 is input in the CPU 124, the CPU 124 executes control according to the type of information which has been input.

The hard disk 128 stores a large volume of data such as data sent from the host computer 1 and accompanying information. The EEPROM 129 stores information unique to the printer. Such information is used when the recording is performed. The disk controller 127 controls access to the non-volatile storage unit 133. Reading and writing of data of the non-volatile storage unit 133 is performed by the control of the disk controller 127.

The panel interface 130 controls display of the operation panel 12 and input via the operation panel 12. The engine interface 132 directly controls the printer engine 122 that realizes recording. The printer engine 122 is a mechanism using an ink jet recording method. According to the printer engine 122, a recording medium such as printing paper is conveyed and recording is performed on the recording medium. Roll paper or cut paper is used for the recording. If printing paper, whose length in the conveying direction is not determined in advance, such as roll paper, is used, the paper is cut by a cutter (not shown) after the printing is performed.

Figure 2:
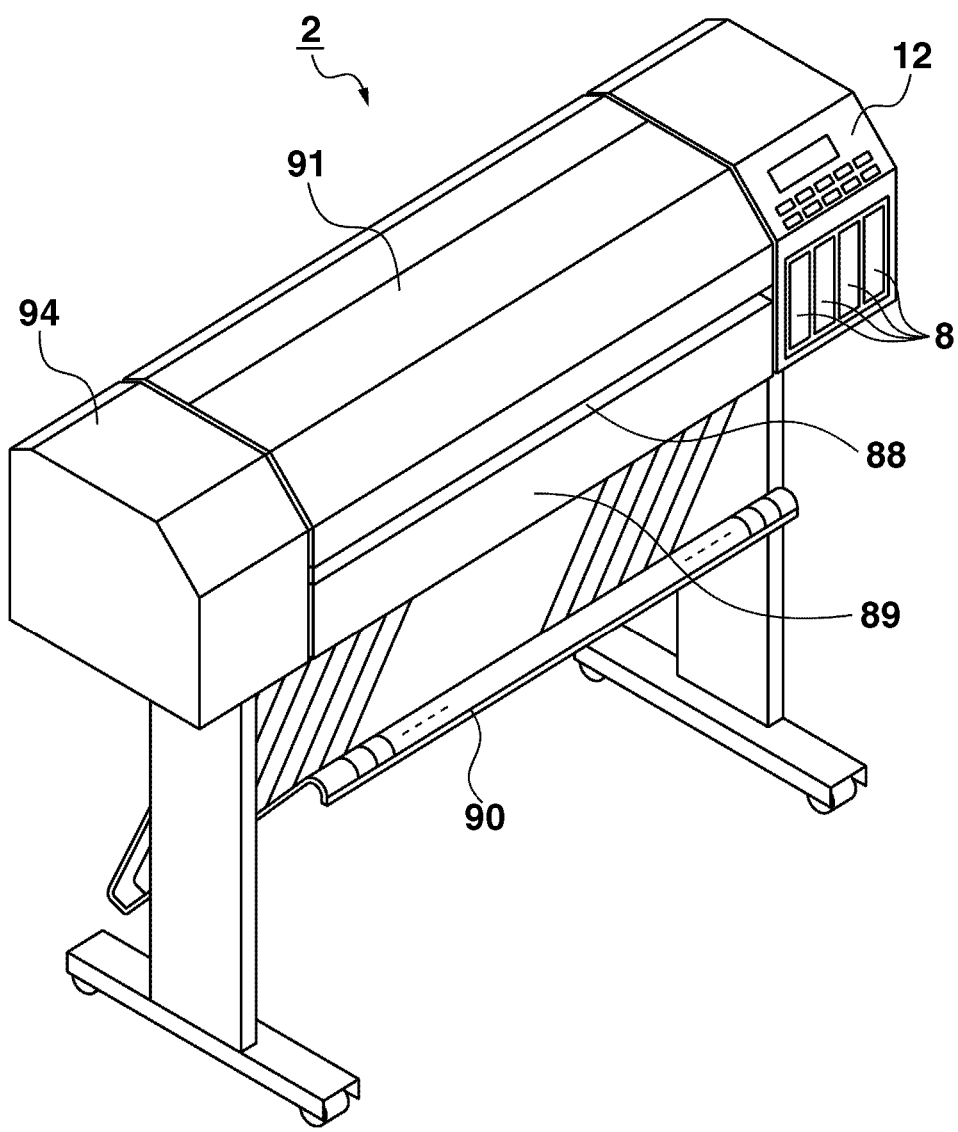
FIG. 2 is a perspective view of a printer included in the printing system illustrated in FIG. 1.

FIG. 2 is a perspective view of the printer 2 included in the printing system illustrated in FIG. 1. As illustrated in FIG. 2, a manual feed insert port 88 is provided at the front side of the printer 2. Further, a roll paper cassette 89, which can be opened/closed, is provided under the manual feed insert port 88. If roll paper is used as the recording medium, the roll paper is set in the roll paper cassette 89. Then, by a conveyance unit (not shown), the recording medium, such as printing paper set in the manual feed insert port 88 or the roll paper cassette 89, is conveyed to the inside of the printer where the recording is executed.

The printer 2 further includes an apparatus main body 94, a stacker 90 used for stacking discharged recording media, and an upper cover 91. The upper cover 91, which can be opened/closed, is transparent and thus the inside can be seen through the cover. Further, on the right side of the apparatus main body 94, there are provided the operation panel 12, an ink supply unit (not shown), and an ink tank 8. According to the example of the apparatus illustrated in FIG. 2, recording onto a recording medium of a large size equal to, for example, B0 or A0 size of cut paper is possible.

The printer 2 prints the print data received from the host computer 1 via the bidirectional interface 3 on a recording medium. If the size of the page(s) containing the print data and the size of the recording medium on which printing is to be performed do not match, the print data will go beyond the recording medium or unwanted margins will be generated on the recording medium.

Figure 3A:
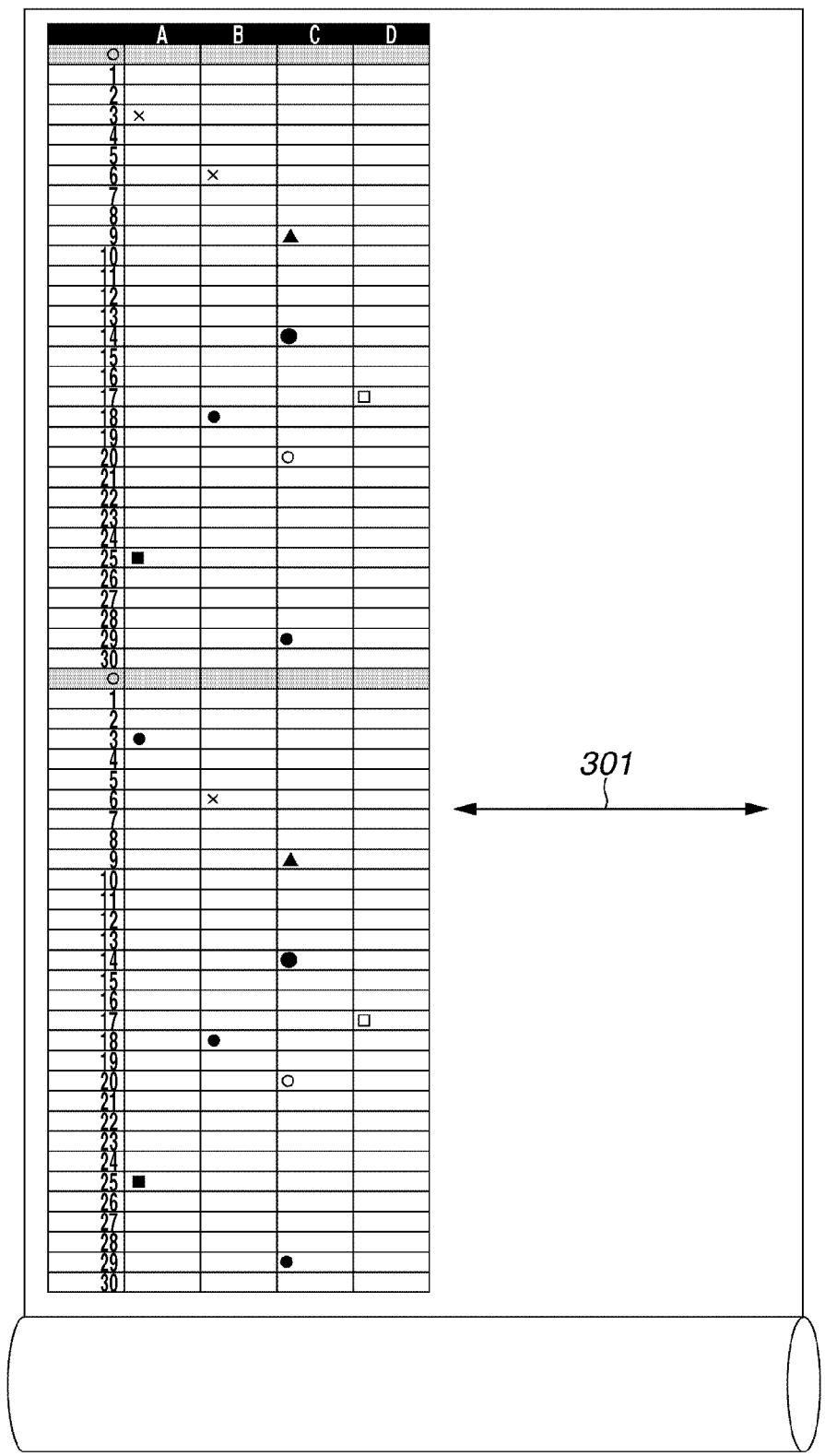
FIGS. 3A and 3B illustrate examples of a printed recording medium.
Figure 3B:
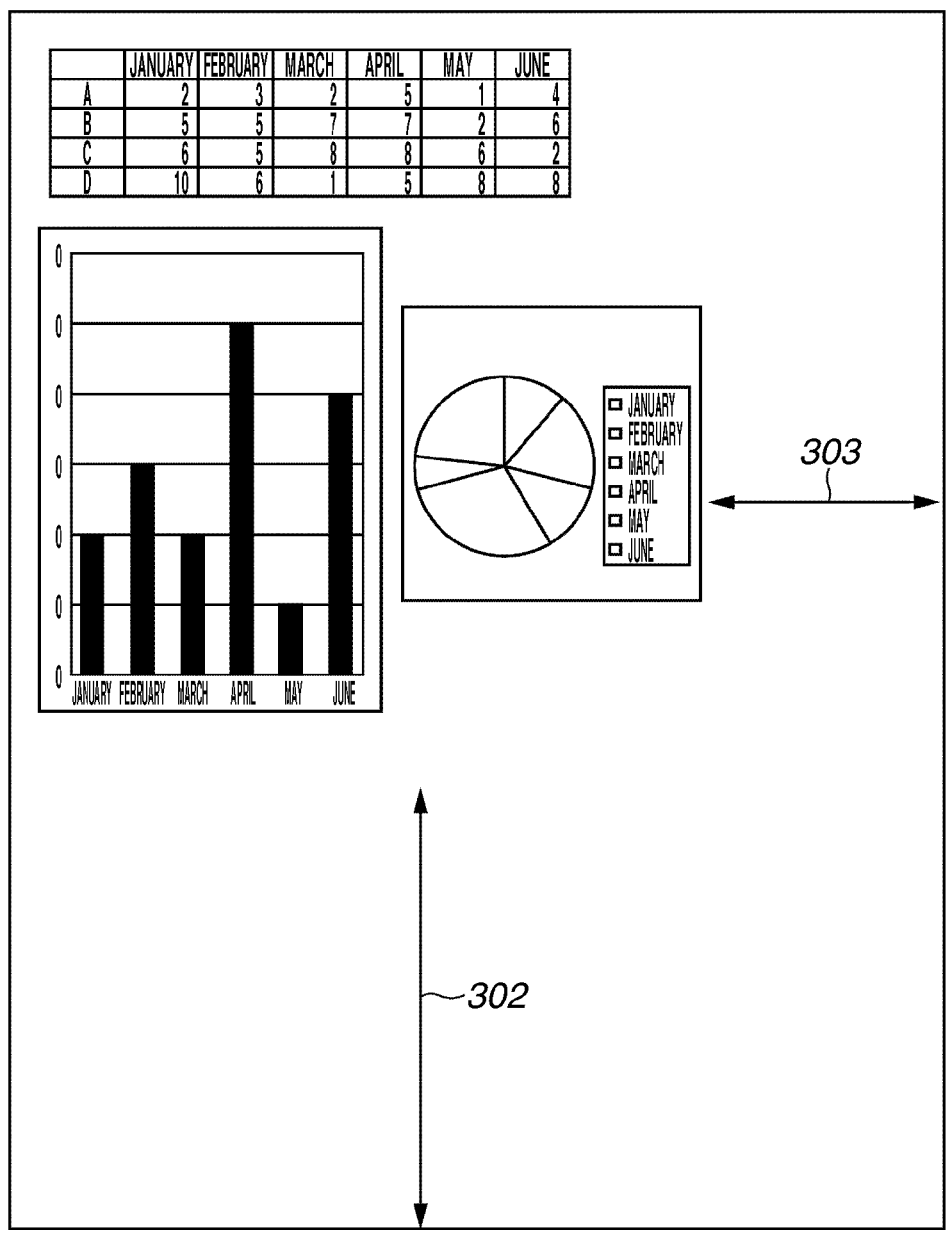

FIGS. 3A and 3B illustrate a recording medium in which print data has generated unwanted margins. FIG. 3A illustrates printed roll paper with a margin. FIG. 3B illustrates printed cut paper with margins. According to the example in FIG. 3A, although the user desires to print a table that matches the width of the roll paper, if the width of the generated table and the width of the paper size set in the spreadsheet software are different, a margin 301 is generated. Similarly, in the case of cut paper, if the width or height of the generated table or graph and the width or height of the paper size set in the spreadsheet software are different, margins 302 and 303 are generated. The margins shown in FIGS. 3A and 3B represent an unnecessary waste of printing material and may result in suboptimal illustrations.

Figure 4:
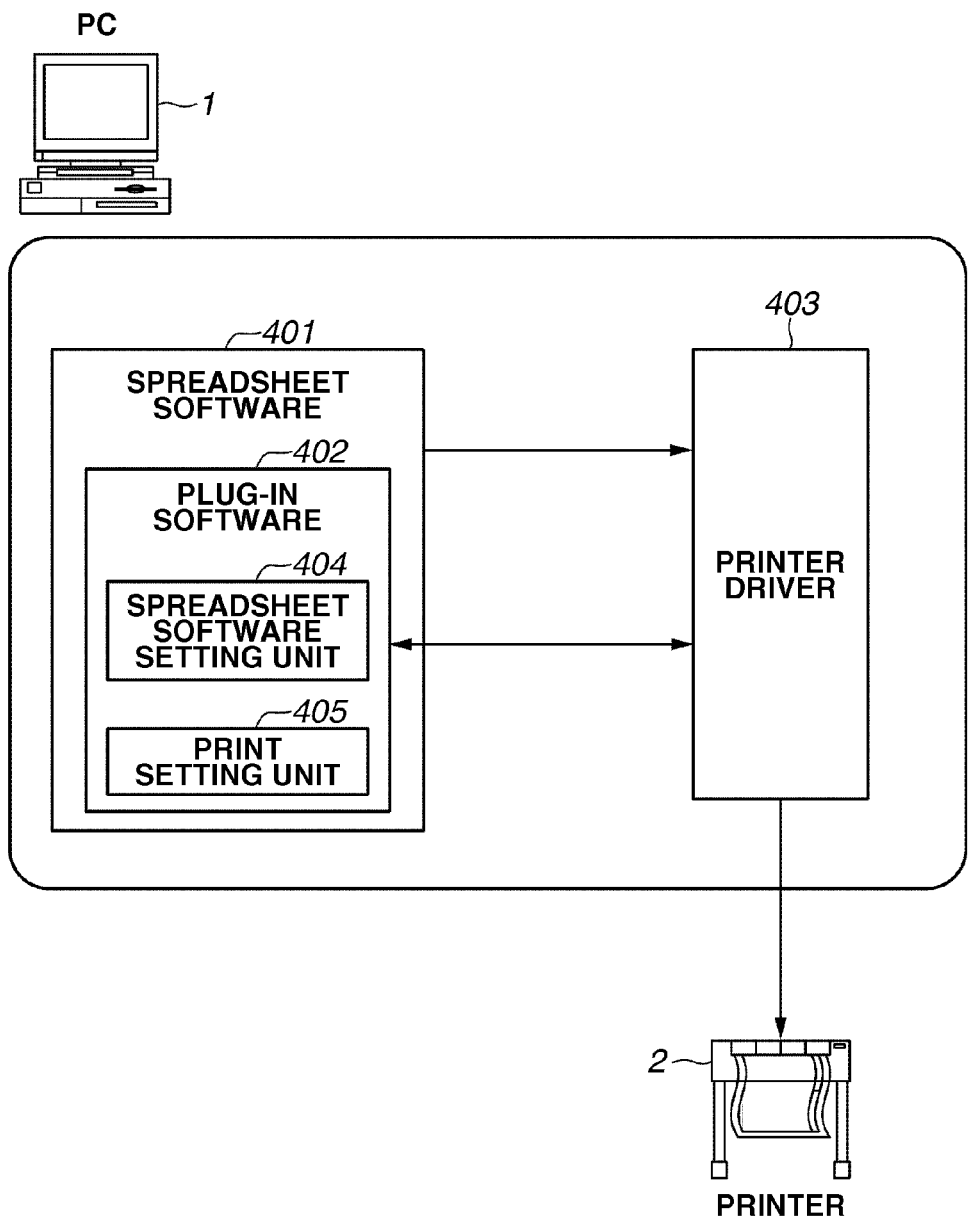
FIG. 4 is a block diagram illustrating a software configuration of a host computer.

FIG. 4 is a block diagram illustrating a software configuration of the host computer 1. Spreadsheet software 401 operates on the host computer 1. The spreadsheet software 401 generates a table based on input data, such as characters and numerical values, and also generates a graph based on the input data. According to the present exemplary embodiment, a table or a graph generated by the spreadsheet software 401 is called a spreadsheet document.

Further, the spreadsheet software 401 sets a paper size and performs page settings by assigning a page size, which corresponds to the paper size which has been set, to a spreadsheet document such as a table or a graph. By using the page settings, data such as a table or a graph can be enlarged/reduced according to the paper size which is set. When a print instruction is given by the user, the spreadsheet software 401 generates data to be printed according to the page settings and then sends the generated data to a printer driver 403.

According to conventional spreadsheet software, the user can determine the area to be printed from the area where characters and numerical values are input. For example, the user can determine an area including all the cells which have undergone predetermined processing such as input of a character or a numerical value, or coloring, as the area to be printed. In this manner, even if the user does not give an instruction, the area to be printed can be determined.

Plug-in software 402 is used for extending the function of the spreadsheet software and is included in the spreadsheet software 401. The plug-in software 402 gives a command to the spreadsheet software 401 and the printer driver 403, i.e., operates together with the spreadsheet software.

The printer driver 403 receives data to be printed from an application via an operating system (OS), and generates print data which can be printed by the printer based on the received data. Then, the printer driver 403 causes the printer 2 to execute printing by transmitting the generated print data to the printer 2.

Further, the printer driver 403 can set the print settings which are used when the printer 2 performs the printing. Print data is generated according to the print settings set by the printer driver 403. The print settings include settings of the size of the print paper and settings of the scaling method used when the print data is generated.

The spreadsheet software 401 and the printer driver 403 can be linked to the plug-in software 402. When the spreadsheet software 401 or the printer driver 403 receives a command from the plug-in software 402, processing is performed according to the command.

Further, respective programs corresponding to the spreadsheet software 401, the plug-in software 402, and the printer driver 403 are stored in the ROM 103 or the external storage unit 109. The processing of the software can be realized by the CPU 101 executing the programs.

A spreadsheet software setting unit 404 is included in the plug-in software 402 and performs processing for causing the spreadsheet software 401 to make various settings. A print setting unit 405 is also included in the plug-in software 402. The print setting unit 405 performs various settings for the printer driver 403 and further causes the printer driver 403 to perform the processing necessary in executing the printing operation. Processing of the spreadsheet software setting unit 404 and the print setting unit 405 will be described in detail below.

Figure 5:
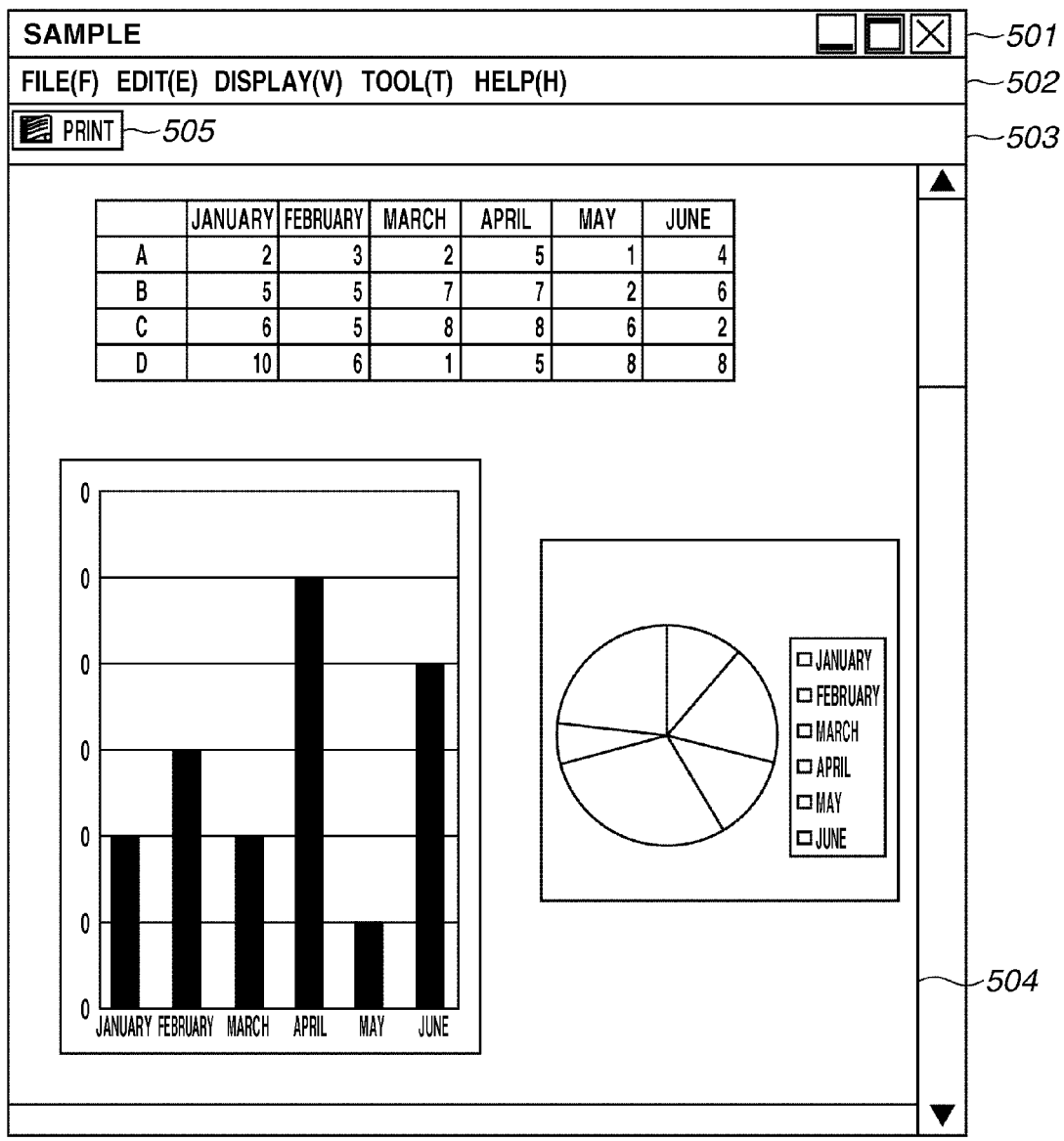
FIG. 5 illustrates a display screen which is displayed when spreadsheet software is started.

FIG. 5 is a display screen which is displayed on display 107 of host computer 1 (FIG. 1) when the spreadsheet software 401 (FIG. 4) is started. A title or the like of a file currently being edited by the spreadsheet software 401 is displayed in a title bar 501. Further, functions of the spreadsheet software 401 are displayed in a menu bar 502 in a menu style. Icons used for executing various functions of the spreadsheet software 401 and the plug-in software are displayed in a tool bar 503. A spreadsheet document such as a table or a graph which is currently being edited is displayed in a display area 504.

An icon 505 is used for starting the plug-in software. By registering the plug-in software 402 with the spreadsheet software 401, the icon 505 is displayed on the tool bar 503 of the spreadsheet software 401. When the user designates the icon 505 by a mouse or the like, the plug-in software 402 is started. Processing of the plug-in software 402 will be described below.

When the user gives an instruction using a mouse of the like via the display screen illustrated in FIG. 5, various settings and commands can be performed with respect to the spreadsheet software 401. For example, if an item for page settings is selected from the menu bar 502 illustrated in FIG. 5, a screen used for performing the page settings will be displayed. According to the display, the user selects a paper size or the scaling method so that the data fits into the selected paper size.

Figure 11:
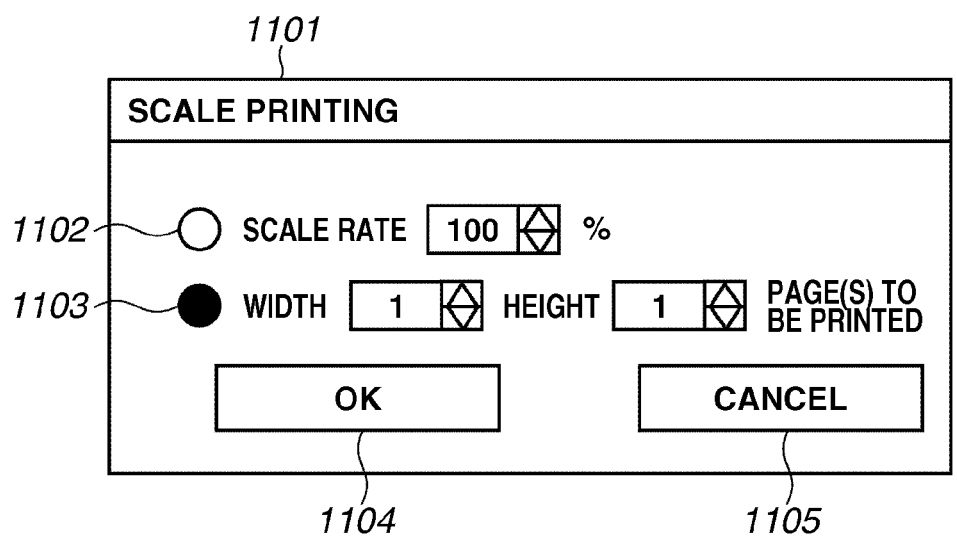
FIG. 11 illustrates a dialog used for setting a scaling method used by the spreadsheet software.

FIG. 11 illustrates an exemplary dialog used for setting the scaling method for the spreadsheet software. A scaling setting dialog 1101 includes a scaling ratio designation radio button 1102, a page number designation radio button 1103, an OK button 1104, and a cancel button 1105. If the scaling ratio designation radio button 1102 is selected, the spreadsheet software is changed into a mode by which the data to be printed is scaled by the designated scaling ratio. At this state, if the OK button 1104 is selected, a page which is scaled by the designated scaling ratio is assigned to the data which is set to be printed.

On the other hand, if the user selects the page number designation radio button 1103, the spreadsheet software is changed into such a mode that the data to be printed is scaled and printed on a designated number of pages. In this state, if the user selects the OK button 1104, the designated number of pages is assigned to the data which is set to be printed. For example, if the user selects the page number designation radio button 1103 and designates one page wide by one page tall, then a scaling ratio that allows fitting of the data to be printed on one page can be set. On the other hand, if the cancel button 1105 is selected, the screen returns to the screen of the scaling setting dialog 1101.

Further, if the user selects an item for printing from the menu bar 502 illustrated in FIG. 5, and further, selects the printer 2 as the printer to perform printing, the printer driver 403 corresponding to the printer 2 is invoked. When the printer driver 403 is invoked, a print setting window used for setting the print settings for the printer driver 403 is displayed.

Figure 14:
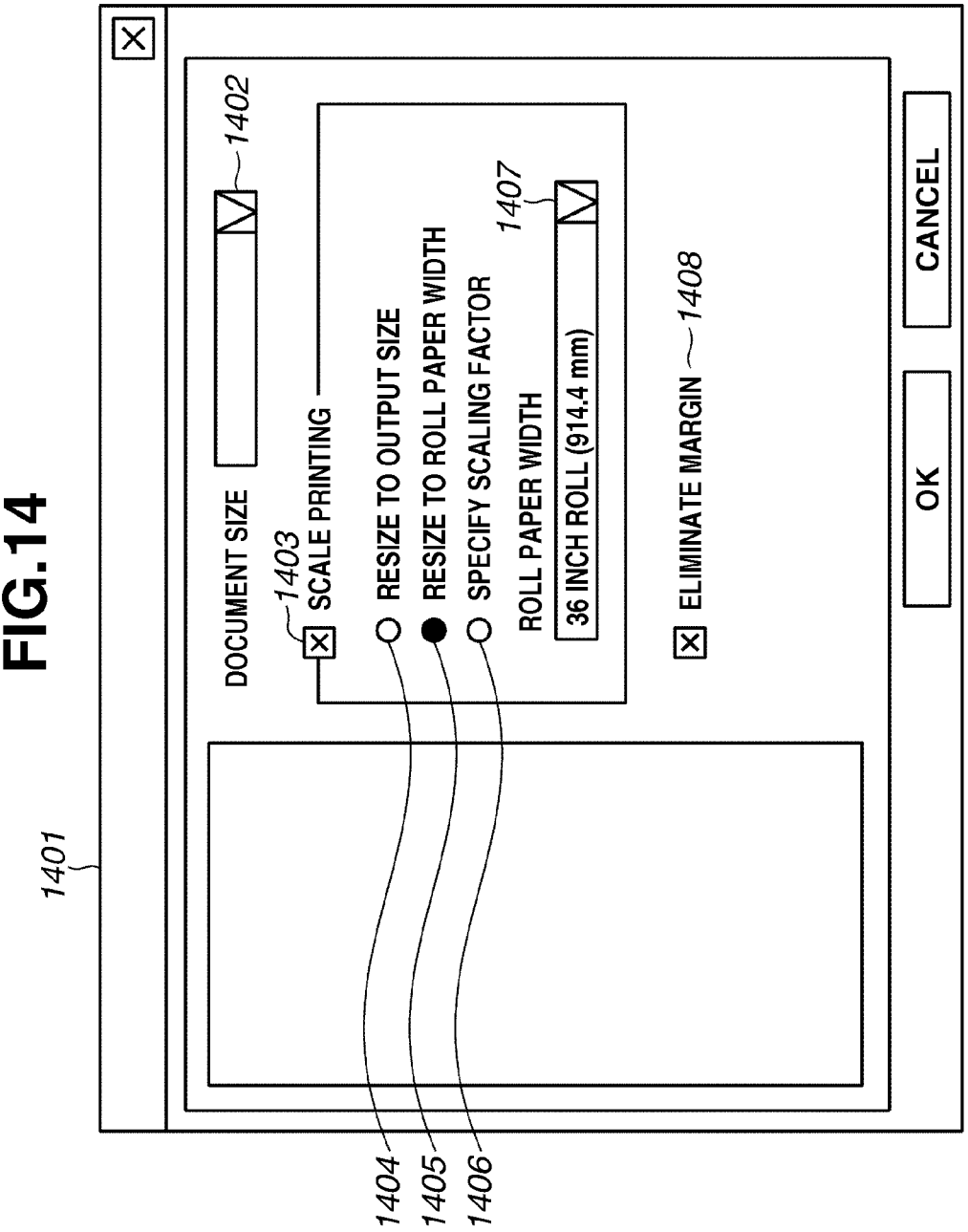
FIG. 14 illustrates an example of a print setting window.

FIG. 14 illustrates an example of the print setting window. A dialog 1401 is used for setting the scaling method of the data to be printed. A paper size set in the application is displayed as a document size in a combo box 1402. When the user gives an instruction by a mouse or the like, a pull-down menu is displayed. If the user selects a size from the menu, the document size is changed to the selected size.

Further, if the user selects a check box 1403, the user can select the scaling method used in generating print data that corresponds to the size of the recording medium on which printing is to be performed (output paper size) from radio buttons 1404 to 1406. If the user selects a "resize to output size" radio button 1404, the size of the data to be printed is enlarged or reduced from the document size set in the combo box 1402 to the paper size designated as the output paper size.

If the user selects a "Resize to roll paper width" radio button 1405, the size of the data to be printed is enlarged or reduced from the document size according to the width of the roll paper designated in a combo box 1407. If a "Specify scaling factor" radio button 1406 is selected, then the document size is enlarged or reduced according to the scaling factor designated by the user.

Further, if the user selects a check box 1408, a margin elimination function is set. This function is used for eliminating the margin in the conveying direction of the printing paper.

Figure 7A:
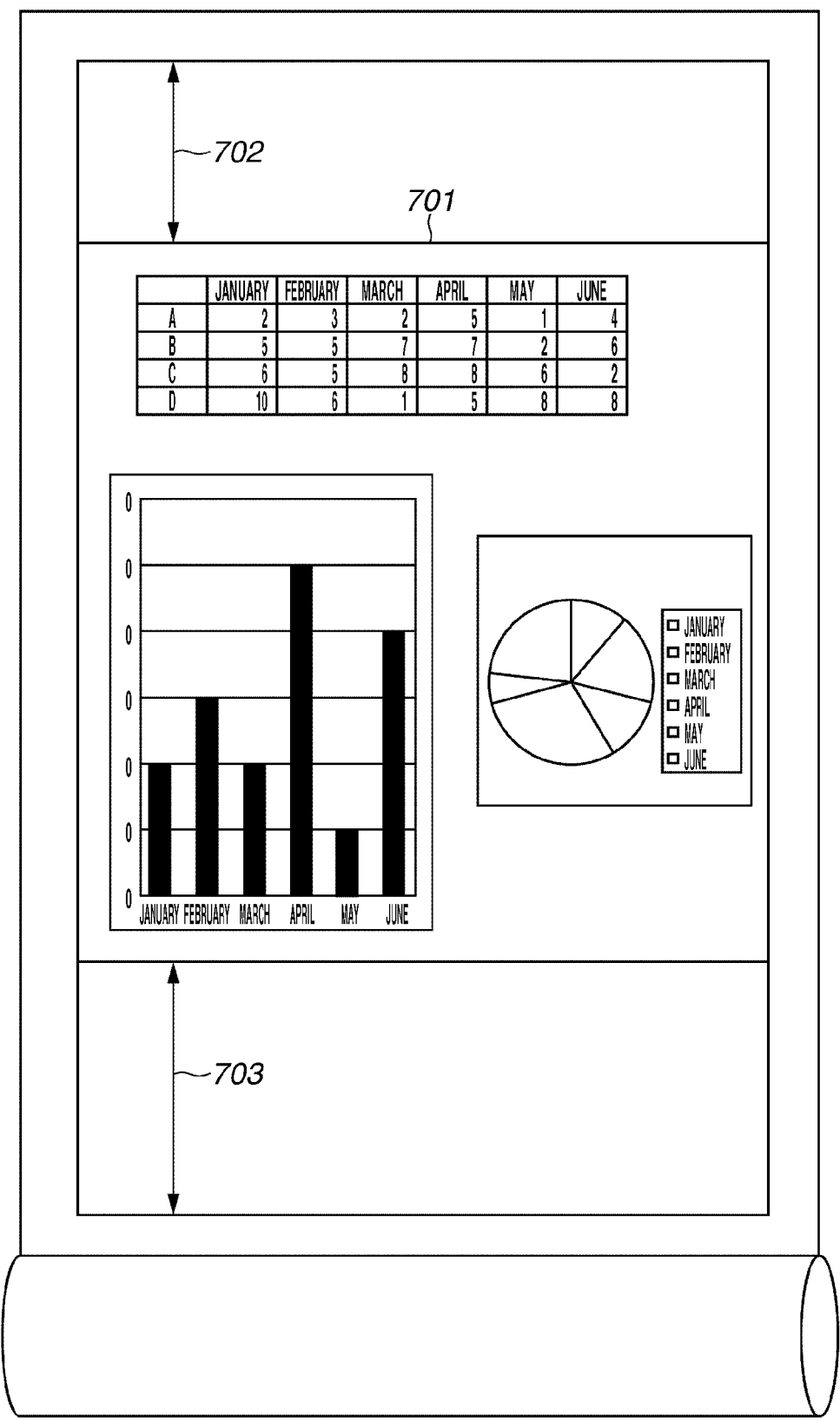
FIGS. 7A and 7B describe a margin deletion function of the printer.
Figure 7B:
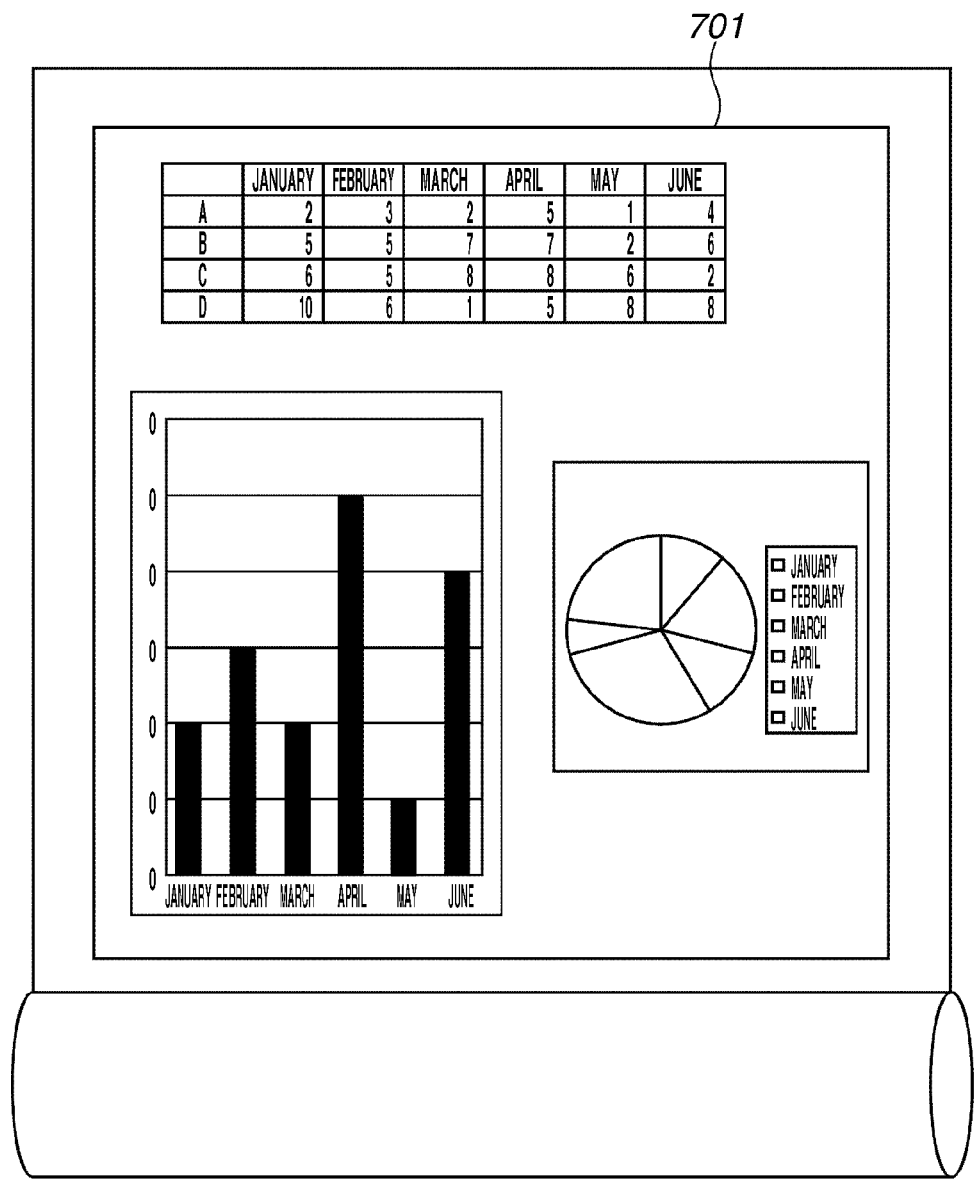

FIGS. 7A and 7B illustrate the margin elimination function of the printer 2. This function is realized by the printer 2 controlling the printing according to a control command sent from the printer driver 403. The printer driver 403 gives such a control that paper feeding and ink discharging are performed regarding the area including the data to be printed out of the image to be printed. As for the area including a margin out of the image to be printed, paper feeding and ink discharging are not performed. In this way, the unwanted margin of the image to be printed can be reduced or eliminated in the printing.

FIG. 7A illustrates an example of a recording medium (printing media) which print data is printed without using the margin elimination function. An area 701 illustrated in FIG. 7A is where the effective data to be printed is printed. Blank areas 702 and 703 in the portions above and below the area 701 represent unwanted margin areas.

To avoid the printing effects shown in FIG. 7A, the margin elimination function causes the printer 2 to analyze the size of the print data (e.g., image) to be printed. In this manner, the printer 2 determines whether it is data to be printed or a margin by determining, for example, whether the data is white data. The printer 2 performs neither paper feeding nor ink discharging with respect to the area which is determined as a margin area. FIG. 7B is an example of a recording medium which is printed using the margin elimination function. According to the margin elimination function, since paper feeding is not performed with respect to the data other than the data which has been determined as the data to be printed, paper feeding is not performed for the data corresponding to the areas above and below the area 701. Thus, as illustrated in FIG. 7B, a printed output having the area 701 printed without margins is obtained.

As illustrated in FIGS. 7A and 7B, if printing is performed on paper whose length in the conveying direction is not determined in advance (e.g., roll paper), the paper can be cut at a position corresponding to the print data. Thus, if such paper is used, by cutting the paper at a position corresponding to content of the image to be printed, the margin which is generated with respect to the conveying direction can be eliminated and printing resources can be used more efficiently.

The margin elimination function can be executed by the printer 2 as described above or by the printer driver 403. If the printer driver 403 executes the margin elimination function, the printer driver 403 determines whether the print data is data to be printed or data of a margin (e.g., white data), and then instructs the printer 2 to print the print data which the printer driver has determined as the actual print data to be printed.

Next, the operation of the plug-in software 402 according to the present exemplary embodiment will be described with reference to a flowchart. The plug-in software 402 is started when the user selects the icon 505 illustrated in FIG. 5.

Figure 8:
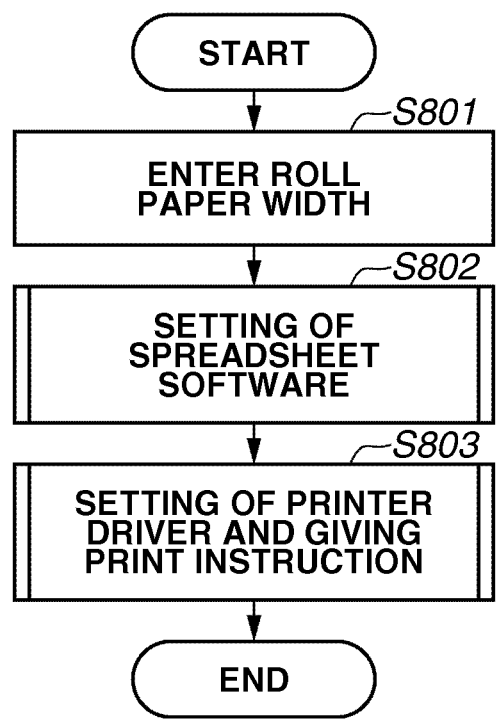
FIG. 8 is a flowchart illustrating a processing procedure of plug-in software.

FIG. 8 is a flowchart illustrating processing procedures of the plug-in software 402. This processing is realized when a program corresponding to the plug-in software 402 is invoked from the ROM 103 by the CPU 101 and the CPU 101 executes the program. Further, this processing can be executed at timing when the plug-in software 402 is started or when the user selects a function corresponding to the plug-in software from the menu screen of the plug-in software.

When the user selects the icon 505 displayed on the display screen of the spreadsheet software 401 illustrated in FIG. 5, the processing proceeds to step S801. In step S801, the CPU 101 instructs the display 107 to display a screen by which the user inputs the width of the roll paper. When the screen is displayed, the user inputs information of the width of the roll paper set in the printer 2. Alternatively, the printer 2 can be configured to automatically detect the width of the roll of paper set therein, and to prompt the user to confirm use of such paper.

Figure 6:
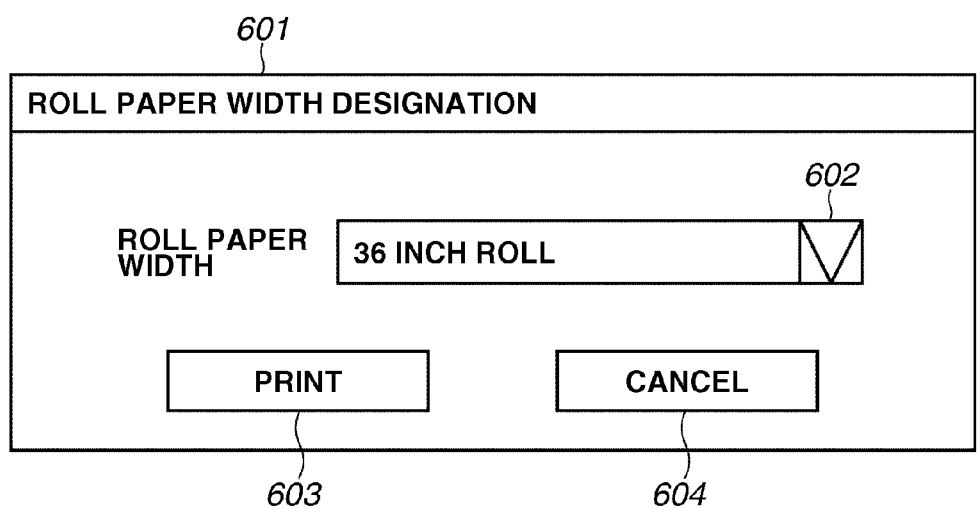
FIG. 6 illustrates a roll paper width designation dialog.

FIG. 6 illustrates a roll paper width designation dialog 601. The roll paper width designation dialog 601 includes a combo box 602 used for designating the roll paper width, a print button 603, and a cancel button 604. If the user selects the print button 603 after designating the width of the roll paper used for the printing by the combo box 602 of the roll paper width designation dialog, information indicating the width of the roll paper which has been designated is input. Further, if the user selects the cancel button 604, the display returns to the screen illustrated in FIG. 5.

Although the user inputs the roll paper width in the example above, if a sensor that detects the roll paper width is included in the printer 2, the CPU 101 can instruct the printer 2 to detect the roll paper width. Then, the roll paper width detected by the sensor is input. Further, if the host computer 1 stores information of the roll paper width before the plug-in software 402 is started, the stored information can be used to be input.

Referring back again to FIG. 8, in step S801, when the information of the roll paper width is input, the process advances to step S802. In step S802, the spreadsheet software setting unit 404 performs the setting of the spreadsheet software 401. In other words, in step S802, the spreadsheet software setting unit 404 sets the paper size with respect to the spreadsheet software 401 and further sets the scaling method used for changing the scaling of the data to be printed to the paper size which has been set. Details of the processing performed in step S802 will be described below with reference to FIGS. 9A to 9C, 10A, and 10B.

In step S803, the print setting unit 405 performs the setting of the printer driver 403 and gives a print instruction. In other words, in step S803, the print setting unit 405 performs settings regarding the scaling processing and the margin elimination function with respect to the printer driver 403 so that data corresponding to the paper size set in step S802 is printed on the roll paper having the width input in step S801. Details of the processing in step S803 will be described below with reference to FIGS. 12A to 12C, 13A, and 13B.

Next, processing of the spreadsheet software setting unit 404 in step S802 in FIG. 8 will be described. The spreadsheet software setting unit 404 performs the page setting of the spreadsheet software 401.

Figure 9A:
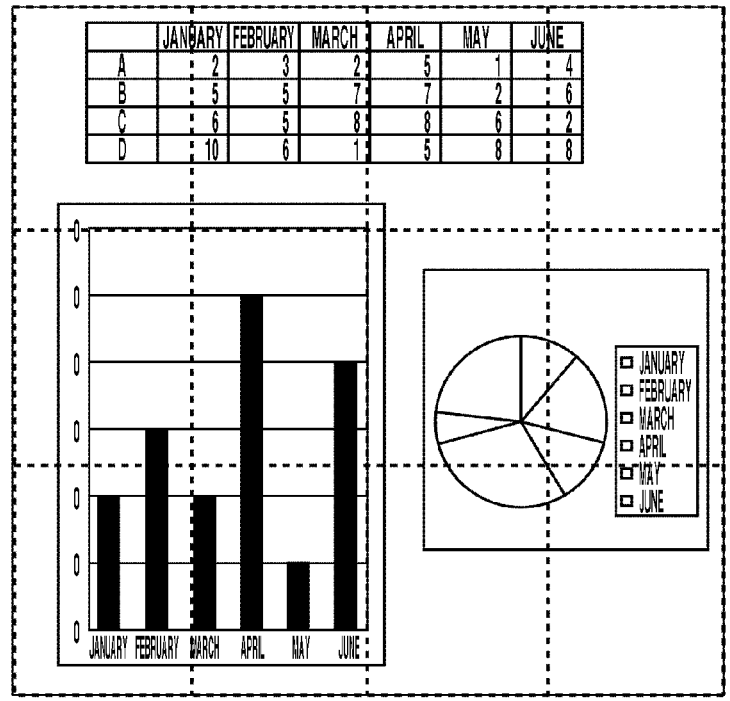
FIGS. 9A to 9C illustrate a page set as a print area in the spreadsheet software.
Figure 9B:
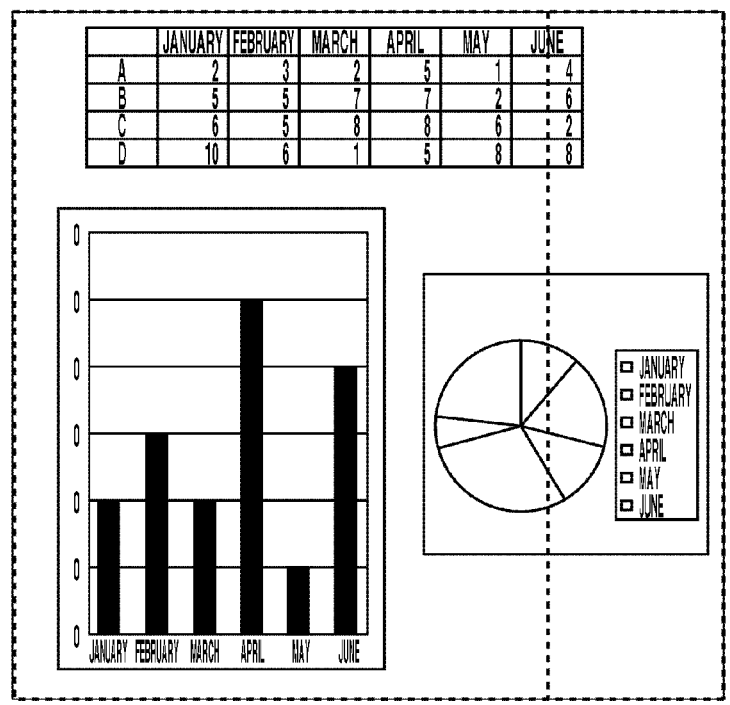
Figure 9C:
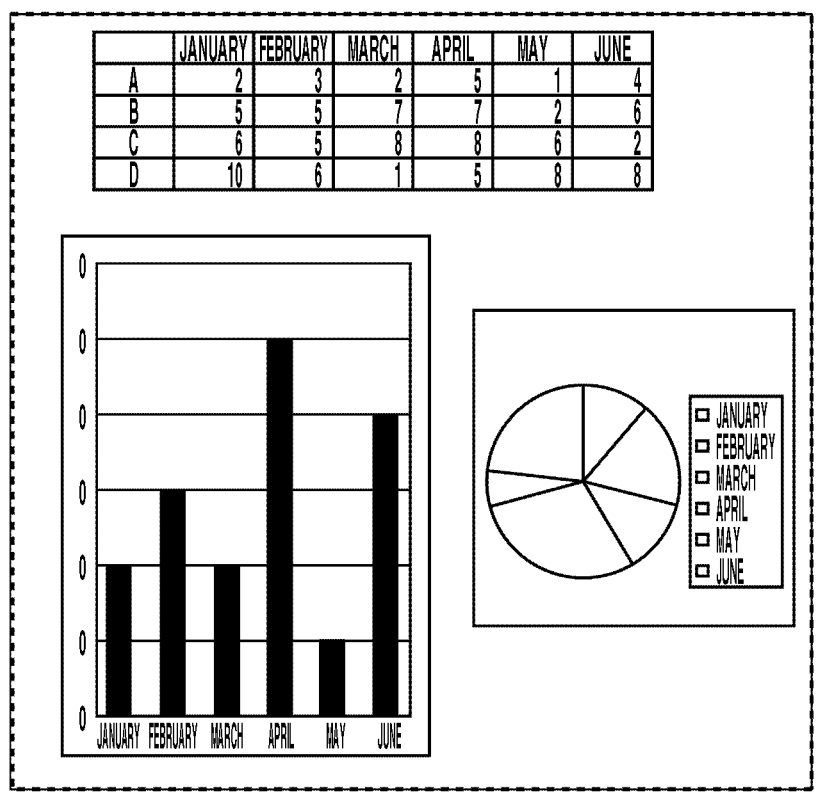

FIGS. 9A to 9C illustrate a page which is set as the print area for the spreadsheet software 401. The dotted lines in FIGS. 9A to 9C are page separation lines which are set with respect to the table and the graph generated by the spreadsheet software 401. FIG. 9A illustrates the initial state of the page setting when the spreadsheet software setting unit 404 performs the processing. In the initial state, the data to be printed will be printed on 12 pages of paper having the size which has been set. Thus, in step S802, the scaling method for changing the size of the data to be printed will be set in the spreadsheet software 401 so that the data is set in a designated paper size by the designated page number.

FIGS. 10A and 10B illustrate processing procedures of the spreadsheet software setting unit 404 performed in step S802. FIG. 10A is a flowchart illustrating processing procedures of the spreadsheet software setting unit 404. FIG. 10B is a sequence diagram illustrating processing of the spreadsheet software setting unit 404 with respect to the spreadsheet software 401 and the printer driver 403.

In step S1001 in FIG. 10A, the spreadsheet software setting unit 404 acquires from the printer driver 403 information indicating the maximum paper size supported by the printer driver 403. The printer driver 403 has a function to generate a paper size which has been arbitrarily designated by the user as the paper size to be set for the data received from the application. The printer driver 403 acquires the maximum paper size that can be supported by using such a function in step S1001.

In step S1002, the width of the paper size to be set in the spreadsheet software 401 is determined. The width of the paper size is set to such a value that it is shorter than the width of the print area determined by the spreadsheet software 401. This processing is performed so that a margin in the width direction of the page is not generated by the scaling processing performed by the spreadsheet software 401 described below. According to the present exemplary embodiment, the data to be printed which is to fit on one page is determined by the spreadsheet software 401. As described above, the spreadsheet software 401 determines the cells which have undergone predetermined processing such as input of a character or a numerical value, or coloring, as the data to be printed. The spreadsheet software setting unit 404 sets the width of the paper size shorter than the width of the print area by acquiring information of the width of the print area from the spreadsheet software 401.

In step S1003, the height of the paper to be set in the spreadsheet software 401 is calculated. Regarding an aspect ratio of the paper to be set in the spreadsheet software 401, it is desirable to have the paper size longer in height compared to the area to be printed so that a margin is not generated in the width direction of the page according to the scaling method performed by the spreadsheet software 401 described below.

Generally, the length of the maximum paper size supported by the printer driver 403 is very long since, in many cases, paper very long in length can be used by the printer driver 403. Thus, according to the present exemplary embodiment, the paper size is calculated so that it matches the aspect ratio of the maximum paper size supported by the printer driver 403. According to the present exemplary embodiment, as an example, the maximum width of the paper size which can be supported acquired in step S1001 is employed as the width of the paper size.

Thus, the parameters necessary in the calculation in step S1003 are the width and the height of the maximum paper size supported by the printer driver 403 acquired in step S1001 and the width of the paper size set in the spreadsheet software determined in step S1002. The height of the paper size set in the spreadsheet software is calculated according to an equation being "height of maximum paper size supported by printer driver×("width of paper size set in spreadsheet software"/"width of maximum paper size supported by the printer driver 403")=height of paper size to be set in spreadsheet software".

According to the present exemplary embodiment, since the width of the paper to be set in the spreadsheet software is the width of the maximum paper size supported by the printer driver, the height of the paper size will be the maximum height supported by the printer driver 403. According to the processing in steps S1002 and S1003, a paper size whose aspect ratio is the same as the aspect ratio of the maximum paper size supported by the printer driver 403 is calculated.

Next, in step S1004, the spreadsheet software setting unit 404 instructs the printer driver 403 to generate the paper size having the width determined in step S1002 and the height calculated in step S1003. According to the present exemplary embodiment, the spreadsheet software setting unit 404 instructs the printer driver 403 to generate the maximum paper size supported by the printer driver 403. At this time, the paper size having the size determined in steps S1002 and S1003, in other words, the paper size set in the spreadsheet software is registered in the printer driver 403.

In step S1005, the paper size having the width and height acquired in steps S1002 and S1003 is set in the spreadsheet software 401. Then, the page setting illustrated in FIG. 9A is changed into the page setting illustrated in FIG. 9B where the data to be printed is set to two pages wide by one page tall. Thus, in order to fit the data to be printed on one page of paper whose size has been determined in steps S1002 and S1003, the data generated by the spreadsheet software 401 needs to be scaled into the generated paper size.

Thus, in step S1006, the spreadsheet software setting unit 404 instructs the spreadsheet software 401 to scale the data into the paper size set in the spreadsheet software 401 in step S1005. Here, the scaling of the data is performed so that the height and the width of the print area of the spreadsheet software 401 fit onto one page. In this manner, the spreadsheet software setting unit 404 can cause the spreadsheet software 401 to scale the data to be printed, which is to be sent to the printer driver 403, so that it fits on one page of paper whose size has been determined in steps S1002 and S1003.

The function that enables setting of a page size so that data to be printed fits on a designated number of pages is included in common spreadsheet software. As described above, when the dialog illustrated in FIG. 11 is displayed, if the user selects the page number designation radio button 1103, the mode is changed so that the data to be printed is scaled and printed on a designated number of pages. By selecting the page number designation radio button 1103 and by designating one page wide by one page tall, the user can set the scaling processing used for fitting a table or a graph to be printed on one page of paper having the paper size set in the spreadsheet software.

Thus, in step S1006 in FIG. 10A, the spreadsheet software setting unit 404 designates the page number for the spreadsheet software 401, and sets the scaling processing that matches the designated page number. In other words, in place of the user giving an instruction necessary in fitting the data to be printed on one page using the dialog in FIG. 11, the spreadsheet software setting unit 404 performs the processing.

If the spreadsheet software setting unit 404 is aware of the selection of the page number designation radio button 1103 and the setting of "one page wide by one page tall", the operation to change the setting of the spreadsheet software 401 is not necessary. Further, the paper size set in step S1005 and the scaling method set in step S1006 are temporarily set. If the setting of the spreadsheet software 401 is changed in step S1005 or S1006, the spreadsheet software setting unit 404 changes the setting of the spreadsheet software 401 back to a setting before the changing according to completion of the processing corresponding to the flowchart illustrated in FIG. 8.

According to the processing in step S1006, the spreadsheet software setting unit 404 can instruct the spreadsheet software 401 to scale the data to be printed so that it fits on one page of paper having the paper size set in step S1005. Thus, the state of the document illustrated in FIG. 9B is changed to the page setting illustrated in FIG. 9C. In FIG. 9C, the width of the print area is changed to one page of the paper size which has been set.

However, the magnification of the spreadsheet software is not always limitless. Further, as described above, since there is an upper limit to the paper size supported by the printer driver, the paper size set in the spreadsheet software in step S1005 also has an upper limit. Thus, if the print area set in the spreadsheet software is very large, the reduction ratio used for fitting the data to be printed onto one page of paper having the size set in the spreadsheet software may exceed the limit of reduction of the spreadsheet software. In such a case, even if the setting that allows fitting of the data onto one page in the spreadsheet software is performed by the spreadsheet software setting unit 404 in step S1006, the data to be printed which has been generated by the spreadsheet software may not fit on one page of paper having the designated paper size.

Thus, in step S1007, the spreadsheet software setting unit 404 determines whether the data to be printed fits on one page. In other words, the spreadsheet software setting unit 404 acquires information indicating the page number which has been set from the spreadsheet software 401 and determines whether the data to be printed fits on one page. If the data fits on one page (YES in step S1007), the processing of step S802 ends. If the data does not fit on one page (NO in step S1007), the processing proceeds to step S1008. In step S1008, a printing-not-available flag is set, and then the processing ends. The above description is based on the assumption that the data to be printed fits on one page.

As described above, the maximum paper size supported by the printer driver 403 is generally very long in height. Thus, in step S1005, if a paper size having the aspect ratio same as that of the maximum paper size supported by the printer driver 403 is set, the page will be normally set to a plurality pages wide by one page tall. Thus, if scaling for the print area to fit on one page is performed according to the processing in step S1006, the page setting is performed so that the area set to be printed matches the width of the paper size as illustrated in FIG. 9C.

However, if the print area set as the area to be printed is longer in height compared to the paper size set in the spreadsheet software, when the scaling to fit the area on one page is performed, even if the print area in the height direction matches the paper size, the print area in the width direction does not meet the paper size. In such a case, a margin is generated in the width direction of the recording medium. Thus, a print flag can also be set if the area to be printed is longer in the height direction than the paper size.

As described above, according to the processing of the spreadsheet software setting unit 404 illustrated in FIGS. 10A and 10B, a paper size is set in the spreadsheet software 401 and scaling processing used for changing the size of the data to be printed into the size of one page of the paper whose size has been set can be set. Accordingly, the data to be printed sent from the spreadsheet software 401 to the printer driver 403 will be data scaled to meet the one page of paper whose size is set in the spreadsheet software 401.

In this manner, a spreadsheet document such as a table or a graph determined as data to be printed by the spreadsheet software 401 is scaled according to the width of the paper size set in the spreadsheet software 401, and sent to the printer driver 403 as the data to be printed. Thus, if the printer driver 403 changes the paper size set in the spreadsheet software 401 into the size of the recording medium on which printing is to be actually performed, the table and the graph can be printed according to the size of the recording medium.

Next, processing of the print setting unit 405 in step S803 will be described. The print setting unit 405 performs print setting of the printer driver 403 and generates print data based on the data to be printed generated by the spreadsheet software 401.

Figure 12A:
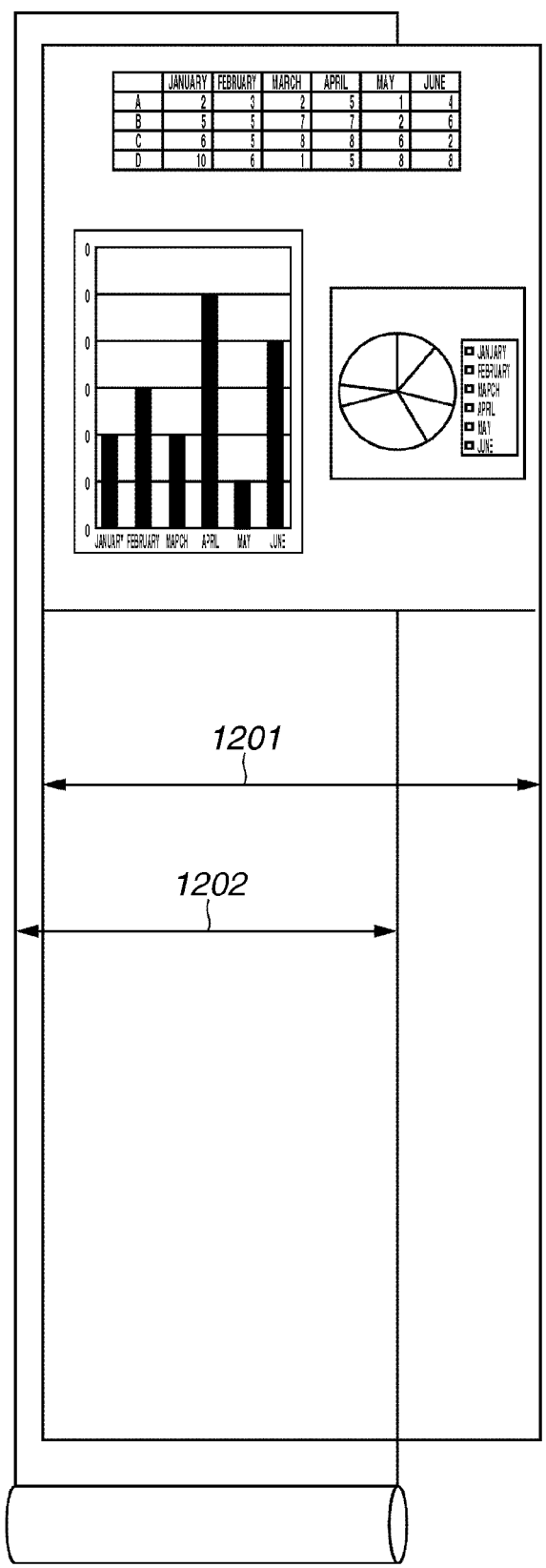
FIGS. 12A to 12C illustrate a relation between a recording medium on which printing is to be performed and print data.
Figure 12B:
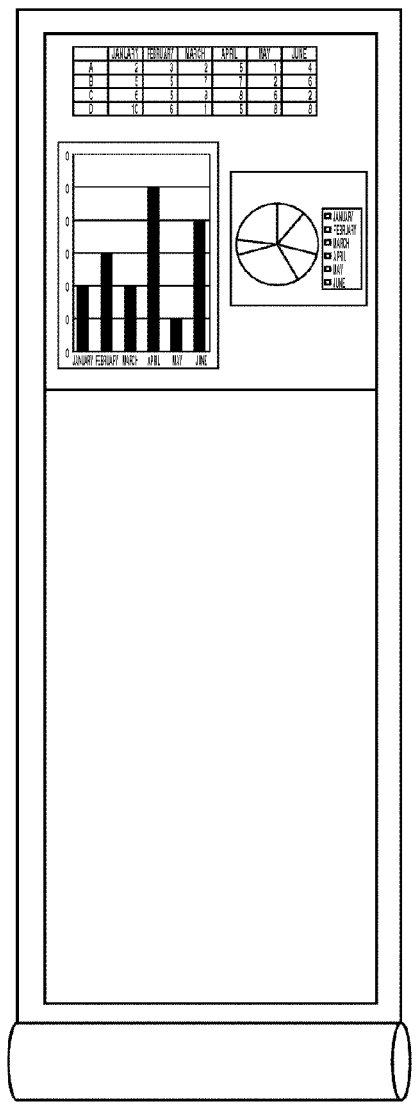
Figure 12C:
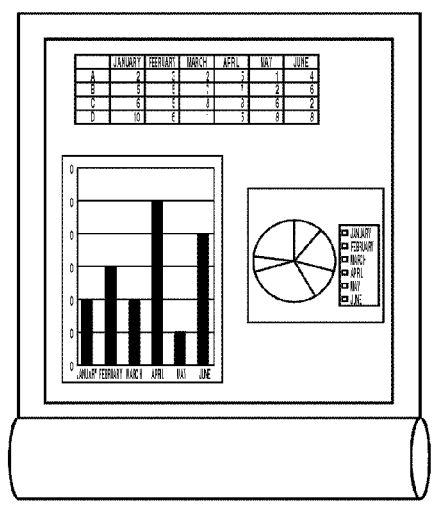

FIGS. 12A to 12C illustrate a relation between a recording medium and print data. FIG. 12A illustrates a relation between print data and a recording medium if the processing of the spreadsheet software setting unit 404 is completed and the printing is performed before the print setting unit 405 performs the operation. As described referring to FIGS. 10A and 10B, data corresponding to the maximum paper size supported by the printer driver 403 is sent from the spreadsheet software 401 to the printer driver 403 according to the present exemplary embodiment. Thus, print data corresponding to the maximum paper size supported by the printer driver 403 is generated. In the following description, printing on roll paper whose width is shorter than the width of the maximum paper size supported by the printer driver, as is illustrated in FIG. 12A, will be described.

A width 1201 is a width of the paper size set in the spreadsheet software 401 according to the instruction given by the spreadsheet software setting unit 404 in step S1004 in FIG. 10A. Further, since the spreadsheet software 401 performs the processing used for fitting the data to be printed on one page, the width 1201 is also the width of the data to be printed sent from the spreadsheet software 401 to the printer driver 403.

A width 1202 is a width of the roll paper set in the printer. This information is based on the information input in step S801 in FIG. 8. Since the width 1202 of the roll paper set in the printer and the width 1201 of paper size supported by the printer driver 403 do not match, if printing is performed in this state, the image to be printed will go beyond the paper. Further, with respect to the data to be printed in the height direction, a margin is generated on the recording medium.

Thus, the print setting unit 405 included in the plug-in software 402 performs setting of the printer driver 403 and instructs the printer driver 403 to perform the scaling of the data to be printed and execute the margin elimination function with respect to the recording medium.

Figure 13A:
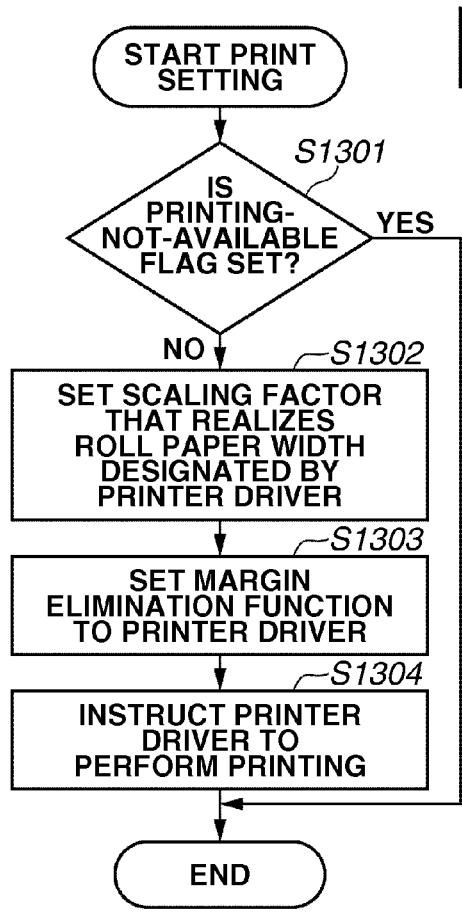
FIGS. 13A and 13B illustrate processing procedures performed by the print setting unit in step S803 in FIG. 8.
Figure 13B:
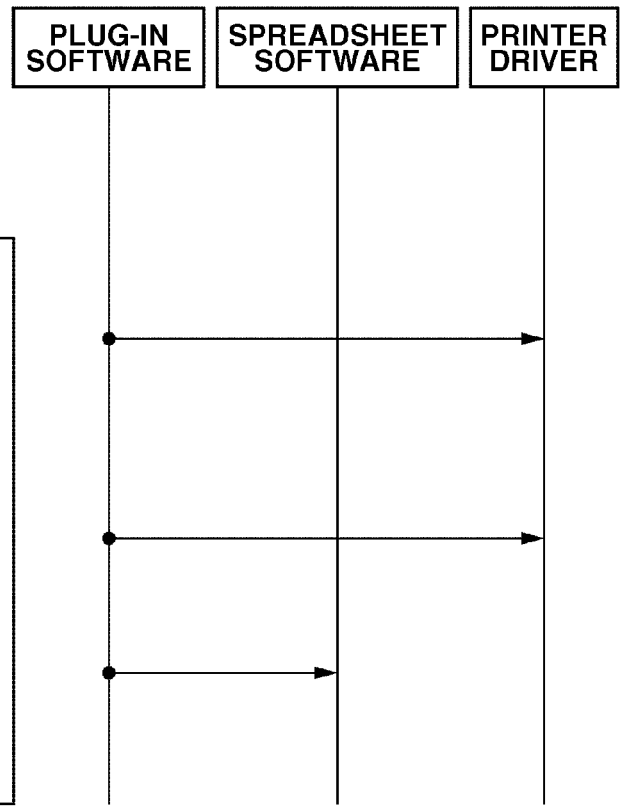

FIGS. 13A and 13B illustrate the processing procedures of the print setting unit 405 performed in step S803. FIG. 13A is a flowchart illustrating the processing procedure of the print setting unit 405. FIG. 13B is a sequence diagram illustrating processing of the print setting unit 405 with respect to the spreadsheet software 401 and the printer driver 403.

In step S1301, the print setting unit 405 determines whether a printing-not-available flag is set. The printing-not-available flag can be set in the above-described step S1008 by the spreadsheet software setting unit 404. If the printing-notavailable flag is set (YES in step S1301), then the processing of step S803 ends. If the printing-not-available flag is not set (NO in step S1301), the processing proceeds to step S1302.

In step S1302, the print setting unit 405 performs the setting of the printer driver 403 regarding the scaling factor of the print data from the paper size set in step S1004 to the roll paper width designated by the combo box 602. This setting is a function used for printing on roll paper and included in a common printer driver. For example, if the user selects the "Resize to roll paper width" radio button 1405 in the dialog illustrated in FIG. 14, the size of the data to be printed is enlarged or reduced from the document size set in the combo box 1402 to the width of the roll paper designated in a combo box 1407.

In step S1302, the setting of such a scaling method is not performed by the user using the dialog 1401 but performed by the print setting unit 405 with respect to the printer driver 403. First, the spreadsheet software setting unit 404 registers the paper size generated in step S1004 as the document size set in the spreadsheet software 401. Next, the print setting unit 405 performs processing corresponding to the selection of the "Resize to roll paper width" radio button 1405 and the designation of the paper roll width input in the combo box 1407 in step S801 in FIG. 8. Then, according to the processing performed in step S1302, the state illustrated in FIG. 12A is changed into the state illustrated in FIG. 12B where the print data is reduced into a size having the width of the roll paper.

Thus, according to the processing in step S1302, even if the dialog 1401 is not displayed or the user operation using the dialog 1401 is not performed, the method for generating print data that matches the roll paper width can be automatically selected.

However, even if the size of the print data to be printed is reduced by the processing in step S1302, a margin may be generated above or below the area where the printing is performed.

Thus, in step S1303, the print setting unit 405 sets the margin elimination function with respect to the printer driver 403. This function is included in a common printer used for printing on roll paper. According to this function, as illustrated in FIGS. 7A and 7B, a margin generated in the paper conveying direction is deleted when the printing is performed. In setting this margin elimination function, normally, the user selects the check box 1408 used for designating the margin elimination function by a dialog such as the one illustrated in FIG. 14. On the other hand, in the processing in step S1303, the print setting unit 405 performs the processing of designating the margin elimination function with respect to the printer driver 403. Although a margin is generated below the print area in the state illustrated in FIG. 12B, the margin can be eliminated, as illustrated in FIG. 12C, by the processing in step S1303.

In step S1304, printing is instructed to the printer driver 403. According to this instruction, the printer driver 403 generates the print data according to the print settings set in steps S1302 and S1303, and sends the generated print data to the printer 2. Then, printing will be performed by the printer 2, and the printed output illustrated in FIG. 12C is obtained.

In this way, according to the processing of the print setting unit 405, the print data based on the data to be printed generated by the spreadsheet software 401 can be set into data having the width of the recording medium. Further, by executing the margin elimination function, the margin in the conveying direction can be eliminated.

According to the present exemplary embodiment, even if the user does not interact with the spreadsheet software, a spreadsheet document such as a table of a graph generated by the spreadsheet software can be scaled according to the paper size set in the spreadsheet software. In other words, the width and the height of the spreadsheet document can be scaled according to the width and the height of the paper size set in the spreadsheet software. Then, the spreadsheet document is sent to the printer driver from the spreadsheet software as the data to be printed.

Thus, even if there is no user operation with respect to the printer driver, the printer driver generates the print data that matches the size of the recording medium based on the spreadsheet document received from the spreadsheet software and performs printing of the generated data. Thus, the spreadsheet document such as a table or a graph can be printed in a size that matches the size of the paper.

Further, according to the exemplary embodiment described above, the plug-in software performs the settings of the spreadsheet software and the printer driver. Thus, the user does not need to make the settings of the spreadsheet software and the printer driver, and can perform printing that meets the recording medium by a simple operation. Further, according to the present exemplary embodiment, since the processing is realized by the plug-in software, a print control that matches the printing paper can be realized by a simple operation without any addition of a special function to the spreadsheet software and the printer driver.

Further, according to the exemplary embodiment described above, in step S1004, the printer driver 403 sets the maximum paper size supported by the printer driver 403 as the size of the spreadsheet software. Thus, according to the processing in step S1302, when the scaling is performed by the printer driver 403, as illustrated in FIGS. 12A to 12C, the size of the data will be reduced. Generally, when an image is reduced, deterioration of the image from the original image is small compared to a case where the image is enlarged.

However, the present invention is not limited to the case where the maximum paper size supported by the printer driver 403 is set in the spreadsheet software as described above. For example, if a paper size larger than the paper size input in step S801 is set for the spreadsheet software, the printer driver will perform the reduction processing as illustrated in FIGS. 12A to 12C.

According to the above description, the paper size is reduced so that it fits the width of the roll paper. However the paper size can also be enlarged so that it fits the width of the roll paper. In enlarging the paper size, the print setting unit 405 sets enlargement of data to be printed with respect to the printer driver in step S1302 in FIG. 13A.

Figure 15C:
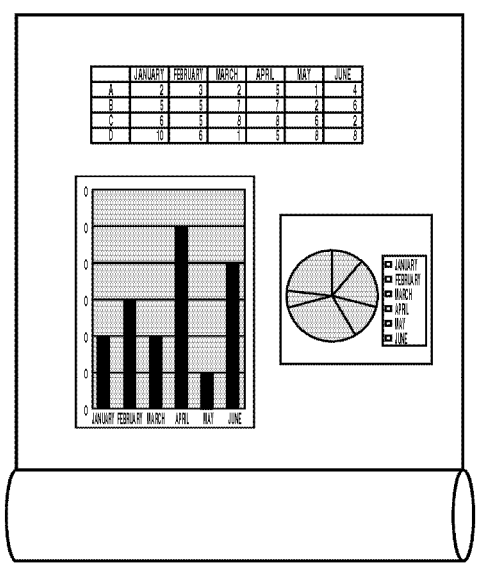

FIGS. 15A to 15C illustrate a relation between the recording medium on which printing is to be performed and print data. As illustrated in FIGS. 15A to 15C, the print data is enlarged to the width of the roll paper before it is printed according to the processing performed by the print setting unit 405.

Further, according to the exemplary embodiment described above, settings for eliminating the margin on the recording medium such as scaling and the margin elimination function have been set with respect to the printer driver 403. However, the present invention is not limited to such settings and an arbitrary setting can be performed for the recording medium. For example, if the setting is performed with respect to the printer driver 403 so that the paper size set in the spreadsheet software 401 has a margin of a predetermined width with respect to the recording medium, a table or a graph to be printed will be printed with a margin that has been set.

According to the exemplary embodiment described above, in setting the scaling processing in the spreadsheet software 401 so that a table or a graph to be printed fits on one page, the data is reduced to fit on one page as illustrated in FIGS. 9A to 9C. Thus, in step S1002 in FIG. 10A, a width shorter than the width of the area to be printed is determined as the width of the paper size to be set in the spreadsheet software 401. However, when the scaling processing is set so that a table or a graph to be printed fits on one page, the spreadsheet software can also be enlarged. In this case, an arbitrary width can be determined in step S1002 so long as the width is equal to or shorter than the maximum width of the paper size supported by the printer driver 403.

Further, in step S1002 in FIG. 10A, the width of the paper size can be set according to the information of the size of the recording medium acquired in step S801 in FIG. 8. For example, if information of roll paper width is acquired, a paper size having that width on one side can be set. Then, by the processing in step S1004, the paper size which has been set will be the document size of the printer driver 403. Since data generated to match the paper size of one page is sent from the spreadsheet software 401 to the printer driver 403, the printer driver 403 does not need to perform the scaling processing.

Generation of print data that matches a recording medium according to the present invention is applied not only to a recording medium, such as roll paper, which is cut after the printing is executed, and can also be applied to paper whose length in the conveying direction is determined before printing, which is so-called cut paper. According to the above-described exemplary embodiment, the data to be printed is generated so that it matches the paper size of one page set in the spreadsheet software. Thus, at least one of the width and the height of the print area set in the spreadsheet software is scaled to match the paper size set in the spreadsheet software. Further, regarding a common printer driver for a printer that prints data on cut paper, the print data can be generated according to the paper size set in the printer driver.

Thus, as is the case with the roll paper, the size of the cut paper is input in step S801 in FIG. 8, and the scaling method used for changing the size to the paper size input in step S801 is performed in step S1302 in FIG. 13A. In this way, the margin of either the width or the height of the cut paper to be printed is at least reduced when the printing is performed.

Further, when roll paper is used, in step S801 in FIG. 8, the user enters the paper width. However, if cut paper is used, the user can enter the width or height of the cut paper, or enter A4 or A3 being a standard paper size. Then, the printer driver sets the paper having the input standard size or the paper having the standard size whose width or height is input as the paper size to be printed.

Furthermore, according to the exemplary embodiment described above, the scaling processing is set so that the data fits on one page when the page setting is performed in the spreadsheet software. However, the present invention is not limited to such a page setting and the page setting may be performed so that the data fits on a predetermined plurality number of pages. Especially, when printing is performed using cut paper, with respect to each of a plurality of recording media corresponding to the plurality of pages, printing that matches each size of the recording media can be performed.

Although spreadsheet software that generates a table or a graph is taken as an example of the application in the descriptions above, the present invention is not limited to such software. For example, the present invention can be applied to application software which can make page settings according to a paper size and a number of pages that are set when the page size and the number of pages are set.

Further, in the description above, the plug-in software is included in the application and operated. However, the application itself may have the function of the plug-in software.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-068280 filed Mar. 24, 2010, which is hereby incorporated by reference herein in its entirety.

What is claimed is:

1. A printing control apparatus which causes a printing apparatus to print an image based on data generated by application software, the apparatus comprising:
    a determination unit configured to determine, according to an instruction given by a user for causing the printing apparatus to print an image of a size corresponding to a size of a recording medium onto the recording medium, the size of the recording medium;
    a first setting unit configured to set, in the application software according to the instruction, a first processing for changing an area size of a printing area corresponding to the data generated by the application software to a page size of one page in the application software;
    a first generating control unit configured to cause, according to the instruction, the application software to generate data to be printed according to the printing area of which the area size is changed to the page size of the one page by the first processing set by the first setting unit;
    a second setting unit configured to set, in a printer driver according to the instruction, a second processing for generating an image corresponding to the size of the recording medium determined by the determining unit based on the page size of the one page;
    a second generating control unit configured to cause, according to the instruction, the printer driver to generate the image corresponding to the size of the recording medium by the second processing set by the second setting unit, based on the page size and the data generated by the application software according to the first generating control unit; and
    a printing control unit configured to cause the printing apparatus to print the image generated by the printer driver according to the second control unit on the recording medium, by using the printer driver.

2. The printing control apparatus according to claim 1, wherein the second setting unit sets, in the printer driver, the page size of the one page, and the printer driver generates print data corresponding to the size of the recording medium, based on the set page size.

3. The printing control apparatus according to claim 1, wherein the first setting unit sets, in the application software, the page size and the first processing.

4. The printing control apparatus according to claim 1, wherein the first setting unit sets, in the application software, the page size and the first processing so that at least one of a width and a length of the printing area fits to the page size.

5. The printing control apparatus according to claim 4, wherein the first setting unit sets, in the application software, the size of the recording medium determined by the determination unit as the page size.

6. The printing control apparatus according to claim 4, wherein the first setting unit sets the page size and the first processing so that a changed width of the printing area fits to the page size and a changed length of the printing area is equal to or smaller than the page size.

7. The printing control apparatus according to claim 1, wherein the application software is spreadsheet software and generates a spreadsheet document to be printed.

8. The printing control apparatus according to claim 6, wherein the recording medium on which the printing apparatus prints the image is a continuous sheet.

9. The printing control apparatus according to claim 8, wherein the printer driver causes the printing apparatus to cut the continuous sheet at a position corresponding to the changed length of the printing area of the continuous sheet.

10. A printing control method for causing a printing apparatus to print an image based on data generated by application software, the method comprising:

a determining step to determine, according to an instruction given by a user for causing the printing apparatus to print an image of a size corresponding to a size of a recording medium onto the recording medium, the size of the recording medium;

a first setting step to set, in the application software according to the instruction, a first processing for changing an area size of a printing area corresponding to the data generated by the application software to a page size of one page in the application software;

a first generating control step to cause, according to the instruction, the application software to generate data to be printed corresponding to the printing area of which the area size is changed to the page size of the one page by the first processing set by the first setting step;

a second setting step to set, in a printer driver according to the instruction, a second processing for generating an image corresponding to the size of the recording medium determined by the determining step based on the page size of the one page;

a second generating control step to cause, according to the instruction, the printer driver to generate the image corresponding to the size of the recording medium by the second processing set by the second setting step, based on the page size and the data generated by the application software according to the first generating control step; and a printing control step to cause the printing apparatus to print the image generated by the printer driver according to the second control step on the recording medium, by using the printer driver.

11. A non-transitory computer-readable medium storing therein a program which when executed by a computer causes the computer to perform the printing control method according to claim 10.

* * * * *